Figure 1:
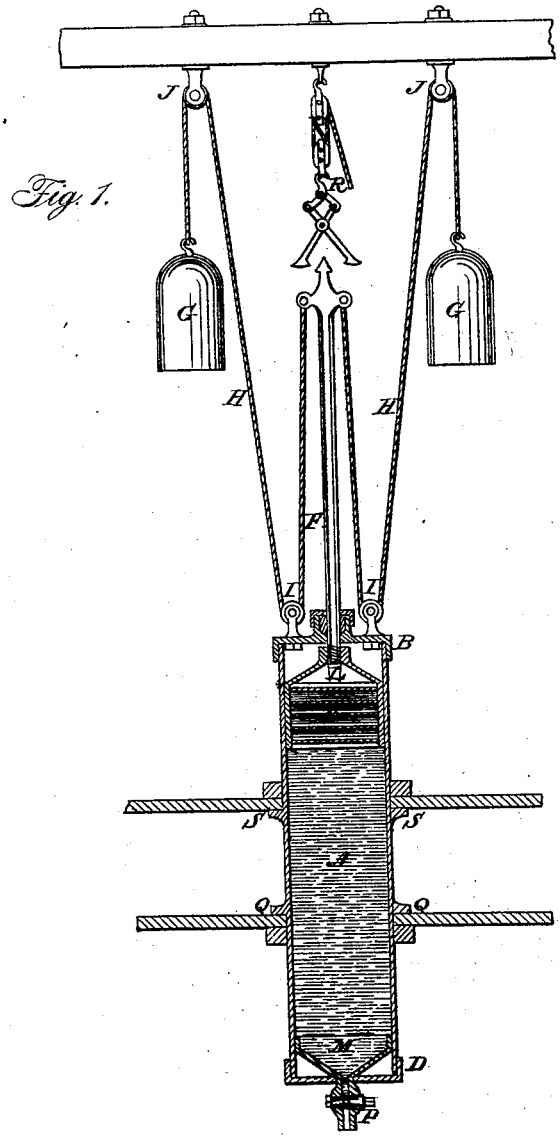
Figure 2:
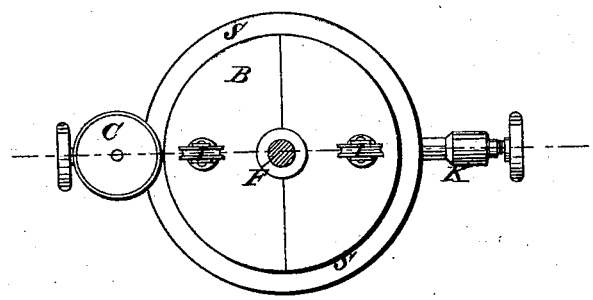
Figure 3:
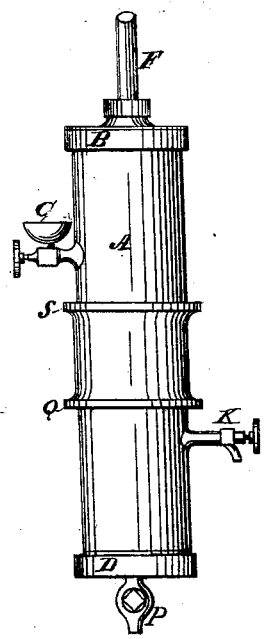

R. B. DOUGLAS.
Refining Oils.

No. 69,192.

2 Sheets—Sheet 2.

Patented Sept. 24, 1867.

Witnesses:

Inventor:

United States Patent Office.

RICHARD B. DOUGLAS, OF CLEVELAND, OHIO.

Letters Patent No. 69,192, dated September 24, 1867; antedated September 12, 1867.

IMPROVED APPARATUS FOR FILTERING PETROLEUM.

*The Schedule referred to in these Letters Patent and making part of the same.*

TO ALL WHOM IT MAY CONCERN:

Be it known that I, RICHARD B. DOUGLAS, of Cleveland, in the county of Cuyahoga, and State of Ohio, have invented a new and Improved Apparatus for Cleansing Oils, &c.; and I do hereby declare the following to be a full, clear, and exact description of the same, sufficient to enable one skilled in the art to which the invention appertains to make use of it, reference being had to the accompanying drawings, forming part of this specification, and in which my invention is represented by an elevation.

The oil is placed in a chamber and forced through a stratum of filtering material by a descending piston. Connecting pipes and faucets are arranged for the induction and eduction of oil, and for the retraction of the piston. In the drawings—

A is a cylinder made of cast iron or other metal, with a smoothly-polished inside surface, and having a cover, B, and bottom, D. C is a cock through which oil or other liquid enters the cylinder. E is a drum fitted to the interior of cylinder A, and connected to the piston-rod F, by which it is elevated and depressed. The drum E is a chamber containing the filtering material, which may consist of fibre either in a mass or in fabric, or of sponge or other porous permeable material. The fibre may be cotton, flax, wool, or hemp, or a mixture of them, or of some other similar vegetable or animal material capable of arresting extraneous and gritty materials, which injure the usefulness of the oil. Oil being placed in the cylinder A, the drum E being charged with the filtering material, is depressed by means of the rod F and any power suitably applied. I have shown the weights G G, cords H, and pulleys I J, as a suitable means of operating the drum-filter, but any other mode of operating it may be adopted which convenience may dictate. As the drum-filter descends the oil passes through and above it, and when the drum has descended below the discharge-cock K the oil is ready to be discharged, the dirt being carried down below the filter, leaving the clear oil above it. The ropes H H are made fast at the top of the rod F, and pass down through pulleys I I, then up and over pulleys J J, thence down and are attached to weights G G, which in their descent actuate the drum E containing the cleansing material, and force it through the oil or other liquid contained in cylinder A. K is a cock through which the cleansed liquid will be drawn off after the drum E has descended below this point. The cock is so arranged as to form a surface even with the inside of the chamber, so as not to afford a lodgment for any dirt. M is a false bottom made in the shape of a funnel, with perpendicular sides, as shown in the drawing. It is made of sheet metal, and is made to fit snugly in the cylinder A. It is designed to receive the water-grit and all organic matter forced from the oil or liquid by the cleanser, which descends until its bottom comes in contact with the top edge of the false bottom. P is a cock by which the water, grit, dirt, &c., are removed. Q Q S S are rims or flanges on the cylinder, by which it is supported on the platform or floor. R is a hoisting apparatus, by which the drum-filter is raised after the oil above it has been discharged at cock K. The cast-iron cover B is made in two pieces, a hole in the intersection being packed to form a stuffing-box for the rod F, and is bolted to the cylinder. The drum may be connected to the piston-rod by four arms, and has on its upper and lower surfaces gratings which hold in the fibre or other cleansing material with which it is charged. The drum-filter E may be caused to act by passing in the reverse direction, in which case the dirt, &c., will be above the filter, but I prefer the arrangement shown in the drawings, which carries the filth downwards conveniently for its discharge.

Having described my invention, what I claim therein as new, and desire to secure by Letters Patent, is—

The drum-filter E, in combination with the cylinder A, the inlet and eduction cocks C K, and dirt-discharge P, substantially as described.

To the above specification of my invention I have set my hand this 25th day of January, 1867.

RICHARD B. DOUGLAS.

Witnesses:
  N. W. TUCKER,
  J W. LEESE.